United States Patent
Sano et al.

(10) Patent No.: US 12,056,964 B2
(45) Date of Patent: Aug. 6, 2024

(54) WORK VEHICLE STATE DETECTION SYSTEM, WORK VEHICLE, AND WORK VEHICLE STATE DETECTION METHOD

(71) Applicant: Komatsu Ltd., Tokyo (JP)

(72) Inventors: Shinya Sano, Tokyo (JP); Yoshitaka Hirano, Tokyo (JP); Matsuo Yoshimoto, Tokyo (JP); Shinji Kobayashi, Kawasaki (JP)

(73) Assignee: Komatsu Ltd., Tokyo (JP)

( * ) Notice: Subject to any disclaimer, the term of this patent is extended or adjusted under 35 U.S.C. 154(b) by 1022 days.

(21) Appl. No.: 16/967,161

(22) PCT Filed: Mar. 6, 2019

(86) PCT No.: PCT/JP2019/008964
§ 371 (c)(1),
(2) Date: Aug. 4, 2020

(87) PCT Pub. No.: WO2019/172344
PCT Pub. Date: Sep. 12, 2019

(65) Prior Publication Data
US 2020/0364952 A1 Nov. 19, 2020

(30) Foreign Application Priority Data
Mar. 6, 2018 (JP) .................. 2018-040133

(51) Int. Cl.
*G07C 5/02* (2006.01)
*G01M 13/028* (2019.01)
(Continued)

(52) U.S. Cl.
CPC .............. *G07C 5/02* (2013.01); *G01M 13/028* (2013.01); *G07C 5/008* (2013.01); *B60G 11/265* (2013.01);
(Continued)

(58) Field of Classification Search
CPC .......... G07C 5/006; G07C 5/02; G07C 5/008; G01M 13/028; B60G 11/265;
(Continued)

(56) References Cited

U.S. PATENT DOCUMENTS 9,558,599 B2 * 1/2017 Chitty .................. E02F 9/2054
2011/0046842 A1 * 2/2011 Smith .................... G07C 5/006
701/31.4

(Continued)

FOREIGN PATENT DOCUMENTS

CN 1688874 A 10/2005
CN 201575927 U 9/2010
(Continued)

OTHER PUBLICATIONS

International Search Report mailed May 7, 2019, issued for PCT/JP2019/008964.

*Primary Examiner* — Jaime Figueroa
*Assistant Examiner* — Joshua Alexander Garza
(74) *Attorney, Agent, or Firm* — Locke Lord LLP

(57) ABSTRACT

A work vehicle state detection system includes: a travel state detector provided in a work vehicle having a rotating machine and detecting a travel state of the work vehicle; a vibration sensor in the rotating machine; a travel state data acquisition unit acquiring travel state data indicating the travel state; a condition satisfaction determination unit determining whether the travel state satisfies a condition; a vibration detection data acquisition unit acquiring vibration detection data indicating a detection value of the vibration sensor when the travel state satisfies the condition; a normal vibration data storage storing normal vibration data indicating a detection value of the vibration sensor when the rotating machine is normal and the travel state satisfies the condition; and an analysis unit that, based on the vibration detection data and the normal vibration data, analyzes a state of the rotating machine when the vibration detection data is acquired.

18 Claims, 9 Drawing Sheets

(51) Int. Cl.
 *G07C 5/00* (2006.01)
 *B60G 11/26* (2006.01)
(52) U.S. Cl.
 CPC .... *B60G 2202/15* (2013.01); *B60G 2300/026* (2013.01); *B60G 2400/5122* (2013.01)
(58) Field of Classification Search
 CPC .......... B60G 2202/15; B60G 2300/026; B60G 2400/5122
 See application file for complete search history.

(56) References Cited

U.S. PATENT DOCUMENTS

| | | | |
|---|---|---|---|
| 2011/0301992 A1* | 12/2011 | Staaf | G06Q 10/06311 705/7.13 |
| 2016/0258118 A1 | 9/2016 | Jinno et al. | |
| 2018/0095008 A1 | 4/2018 | Kusumi et al. | |
| 2019/0108691 A1* | 4/2019 | Tucker | G05B 23/0232 |

FOREIGN PATENT DOCUMENTS

| | | |
|---|---|---|
| CN | 202038323 U | 11/2011 |
| CN | 104458252 A | 3/2015 |
| CN | 104755345 A | 7/2015 |
| CN | 107615033 A | 1/2018 |
| EP | 3054292 B1 | 2/2017 |
| JP | 2001-305024 A | 10/2001 |
| JP | 2002-022617 A | 1/2002 |
| JP | 2004-268633 A | 9/2004 |
| JP | 2006-090811 A | 4/2006 |
| JP | 2008-134115 A | 6/2008 |
| JP | 2009-281389 A | 12/2009 |
| JP | 2011-203116 A | 10/2011 |
| JP | 2012-112796 A | 6/2012 |
| JP | 2015-219078 A | 12/2015 |
| JP | 2016-038269 A | 3/2016 |
| JP | 2016-145712 A | 8/2016 |
| JP | 2016-215787 A | 12/2016 |
| WO | 2015/140966 A1 | 9/2015 |
| WO | 2017/191313 A1 | 11/2017 |

* cited by examiner

| | |
|---|---|
| ROTATIONAL SPEED N OF DRIVE SHAFT (TRAVEL SPEED V) | Nr [rpm] OR MORE (Vr [km/h] OR MORE) |
| FLUCTUATION AMOUNT OF ROTATIONAL SPEED N OF DRIVE SHAFT (FLUCTUATION AMOUNT OF TRAVEL SPEED V) | WITHIN ±ΔNr [%] (WITHIN ±ΔVr [%]) |
| FLUCTUATION AMOUNT OF PRESSURE P OF SUSPENSION CYLINDER | WITHIN ±ΔP [%] |
| ACCELERATOR OPENING W | Wr [%] OR MORE |
| STEERING ANGLE θ | WITHIN ±θr [°] |

SPECTRUM DATA

FIG.8

| MACHINE PART/DAMAGE | ROTATIONAL SPEED [rpm] | No. |
|---|---|---|
| FIRST BEARING | INNER RING | Nb1 [Hz] |
| | OUTER RING | Nb2 [Hz] |
| SECOND BEARING | INNER RING | Nb3 [Hz] |
| | OUTER RING | Nb4 [Hz] |
| ⋮ | ⋮ | ⋮ |
| FIRST GEAR | TOOTH LACK | Ng1 [Hz] |
| | TOOTH SURFACE WEAR | Ng2 [Hz] |
| SECOND GEAR | TOOTH LACK | Ng3 [Hz] |
| | TOOTH SURFACE WEAR | Ng4 [Hz] |
| ⋮ | ⋮ | ⋮ |

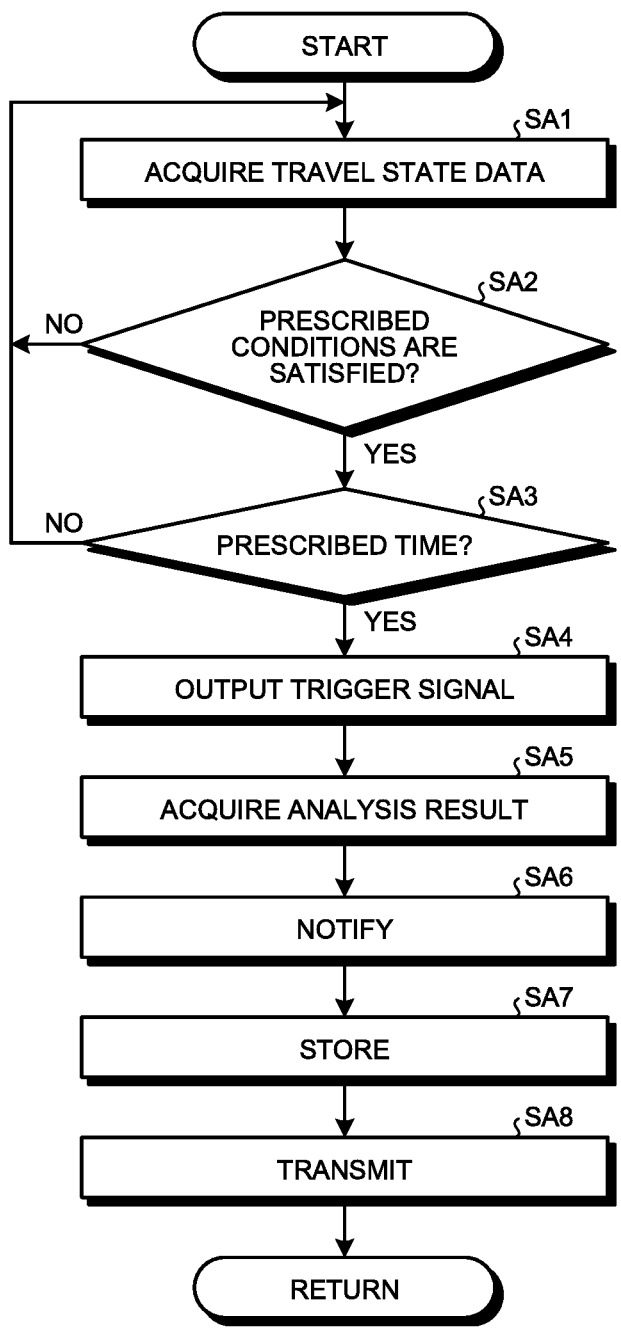

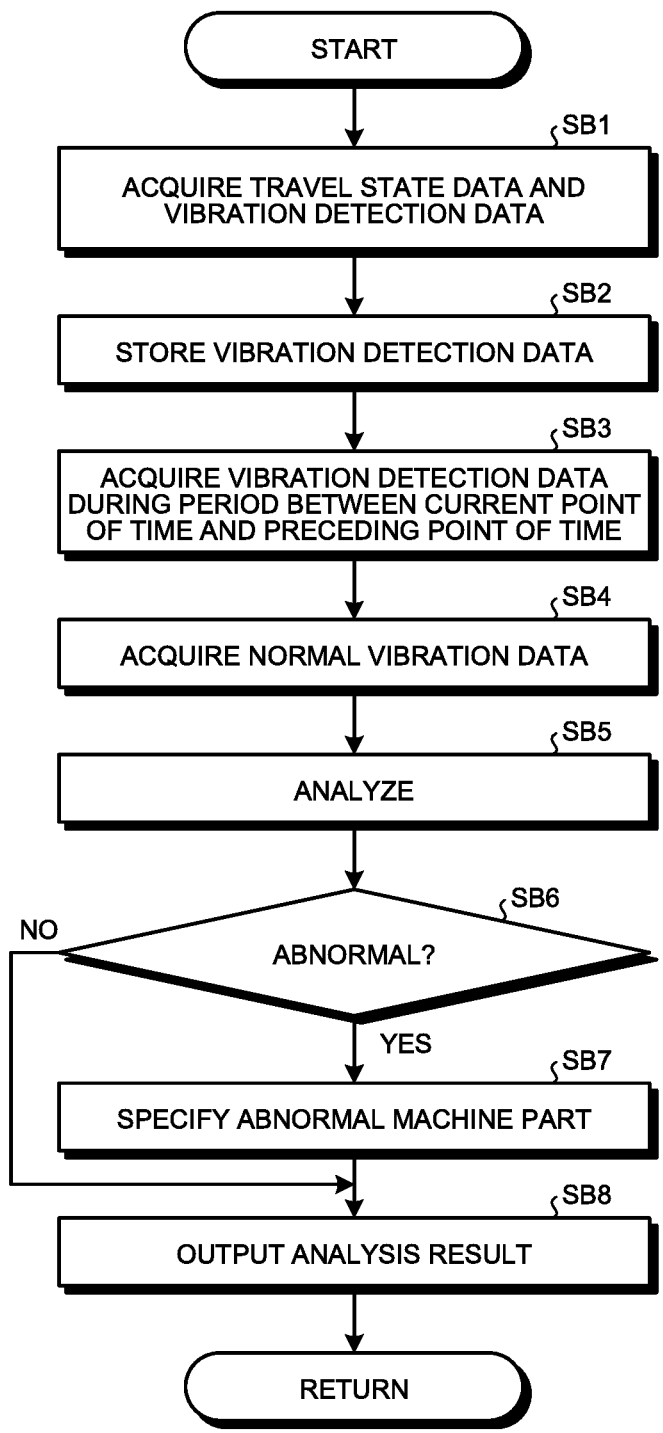

WORK VEHICLE STATE DETECTION SYSTEM, WORK VEHICLE, AND WORK VEHICLE STATE DETECTION METHOD

FIELD

The present invention relates to a work vehicle state detection system, a work vehicle, and a work vehicle state detection method.

BACKGROUND

A wheel-driven work vehicle such as a dump truck or a wheel loader includes a power source such as an internal combustion engine and a rotating machine such as a transmission device and an axle device. Motive power generated by the power source is transmitted to wheels via the transmission device and the axle device. The wheels rotate, whereby the work vehicle travels.

The rotating machine includes machine parts such as gears and bearings, which form a rotating part. When such a machine part deteriorates, small initial peeling occurs on the surface of the machine part. When the machine part is continued to be used in a state where the initial peeling is left unattended, then the peeling progresses, and eventually, the machine part is broken. In addition, when pieces of the broken machine part are scattered around or damage surrounding machine parts and the damage spreads, then a great maintenance cost and a long maintenance period are required. Therefore, there is a demand for a technique capable of detecting an abnormality such as the initial peeling in the machine part at an early stage before a damage spreads even if the abnormality occurs in the machine part.

CITATION LIST

Patent Literature

Patent Literature 1: Japanese Laid-open Patent Publication No. 2016-145712

SUMMARY

Technical Problem

At the stage of initial peeling of the machine part, amounts of generated vibration and abnormal noise are small, and it is difficult to notice abnormalities in the rotating machine of the work vehicle. Therefore, the abnormality in the rotating machine may be recognized after the machine part is broken to spread the damage.

An aspect of the present invention is to accurately recognize a state of the rotating machine of the work vehicle. In the following, the recognition of normality and abnormality of the rotating machine will be described in detail including signs thereof.

Solution to Problem

According to an aspect of the present invention, a work vehicle state detection system comprises: a travel state detection device that is provided in a work vehicle having a rotating machine and detects a travel state of the work vehicle; a vibration sensor provided in the rotating machine; a travel state data acquisition unit that acquires travel state data indicating the travel state; a condition satisfaction determination unit that determines whether or not the travel state satisfies a prescribed condition; a vibration detection data acquisition unit that acquires vibration detection data indicating a detection value of the vibration sensor when the travel state satisfies the prescribed condition; a normal vibration data storage unit that stores normal vibration data indicating a detection value of the vibration sensor when the rotating machine is normal and the travel state satisfies the prescribed condition; and an analysis unit that, based on the vibration detection data and the normal vibration data, analyzes a state of the rotating machine when the vibration detection data is acquired.

Advantageous Effects of Invention

According to the aspect of the present invention, the state of the rotating machine of the work vehicle can be accurately recognized.

BRIEF DESCRIPTION OF DRAWINGS

FIG. 8 is a table illustrating an example of correlation data according to the present embodiment.

FIG. 9 is a flowchart illustrating an example of a state detection method according to the present embodiment.

FIG. 10 is a flowchart illustrating the example of the state detection method according to the present embodiment.

DESCRIPTION OF EMBODIMENTS

Hereinafter, embodiments of the present invention will be described with reference to the drawings; however, the present invention is not limited thereto. Components of the embodiments described below can be appropriately combined with one another. In some cases, some components are not used.

[Work Vehicle]

Figure 1:
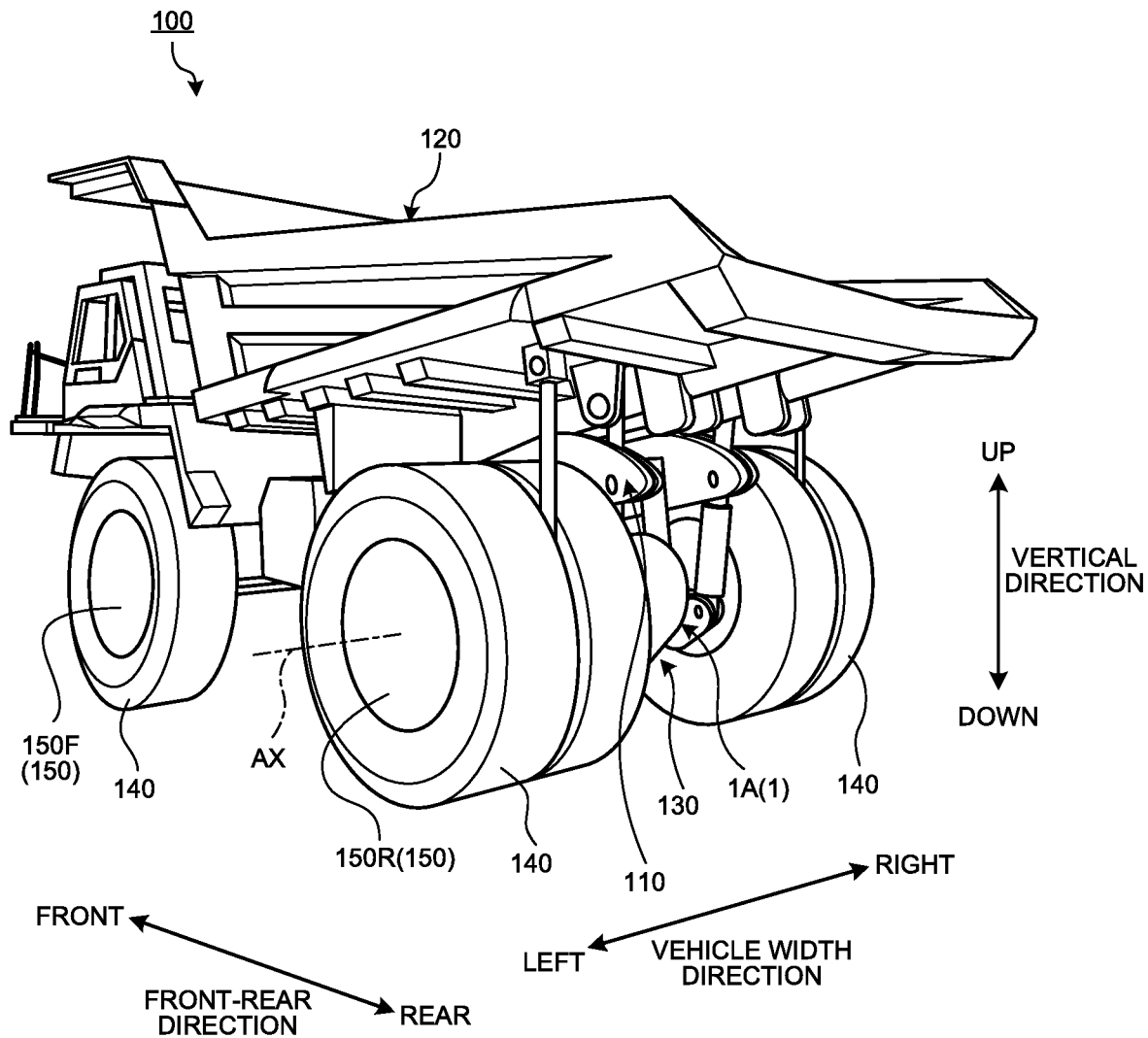
FIG. 1 is a perspective view of an example of a work vehicle according to the present embodiment as seen from the rear.
Figure 2:
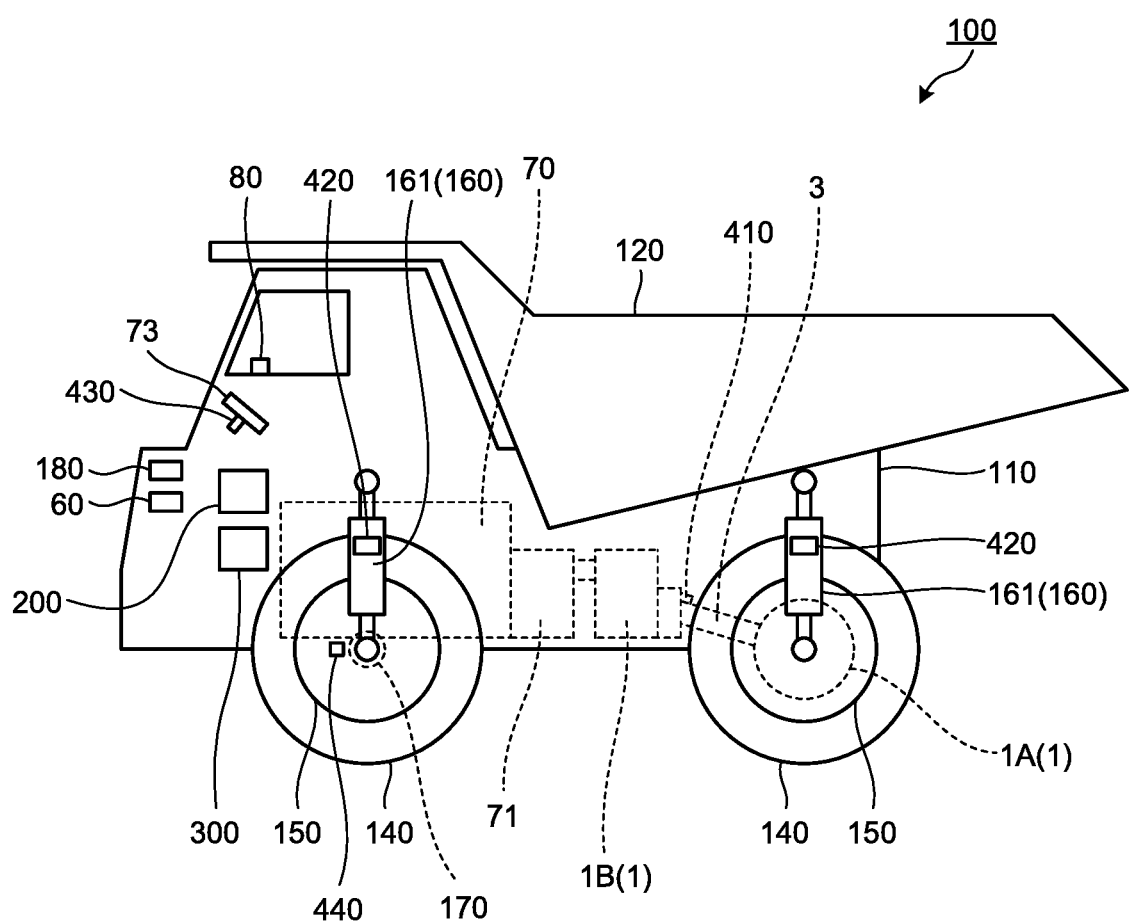
FIG. 2 is a diagram schematically illustrating the example of the work vehicle according to the present embodiment.

FIG. 1 is a perspective view of an example of a work vehicle 100 according to the present embodiment as seen from the rear. FIG. 2 is a diagram schematically illustrating the example of the work vehicle 100 according to the present embodiment. In the present embodiment, the work vehicle 100 is a dump truck that travels with a load at a digging site of a mine. In the following description, the work vehicle 100 is appropriately referred to as a dump truck 100.

In the present embodiment, the dump truck 100 includes a driver's cab in which a driver boards. The dump truck 100 is a manned dump truck operated by a driver. Further, in the present embodiment, the dump truck 100 is a live-axle dump truck.

As illustrated in FIGS. 1 and 2, the dump truck 100 includes a power source 70, a vehicle body frame 110, a dump body 120, and a travel device 130.

The power source 70 is supported by the vehicle body frame 110. The power source 70 includes an internal combustion engine such as a diesel engine. The power source 70 may include a generator that operates by motive power generated by the internal combustion engine and an electric motor that operates by electric power generated by a generator.

The vehicle body frame 110 supports the dump body 120. The dump body 120 is a member on which a load is loaded.

The travel device 130 supports the vehicle body frame 110. The travel device 130 includes wheels 150 on which tires 140 are mounted, suspension devices 160, and a steering device 170.

The wheels 150 are supported by the suspension devices 160. The wheels 150 include front wheels 150F and rear wheels 150R. The rear wheels 150R rotate about a rotation axis AX.

In the following description, a direction parallel to the rotation axis AX will be appropriately referred to as a vehicle width direction, a travel direction of the dump truck 100 will be appropriately referred to as a front-rear direction, and a direction orthogonal to each of the vehicle width direction and the front-rear direction will be appropriately referred to as a vertical direction.

One side in the front-rear direction is a front side, and an opposite side to the front side is a rear side. One side in the vehicle width direction is a right side, and an opposite side to the right side is a left side. One side in the vertical directions is an upper side, and an opposite side to the upper side is a lower side. The front wheels 150F are arranged in front of the rear wheels 150R. The front wheels 150F are arranged on both sides in the vehicle width direction. The rear wheels 150R are arranged on both sides in the vehicle width direction. The dump body 120 is disposed above the vehicle body frame 110.

The suspension devices 160 support the wheels 150. Each of the suspension devices 160 includes a suspension cylinder 161 that supports the wheels 150. The suspension cylinder 161 is disposed between the wheels 150 and the vehicle body frame 110. Hydraulic oil is enclosed in the suspension cylinder 161. The suspension cylinder 161 expands and contracts according to an uneven state of a road surface on which the travel device 130 travels. The suspension cylinder 161 expands and contracts, whereby a pressure of the hydraulic oil sealed inside the suspension cylinder 161 fluctuates.

The steering device 170 steers the front wheels 150F. The steering device 170 operates when a driver operates a steering wheel disposed in the driver's cab.

The travel device 130 includes a rotating machine 1 that transmits the motive power generated by the power source 70 to the rear wheels 150R. The rotating machine 1 includes an axle device 1A and a transmission device 1B. The motive power generated by the power source 70 is transmitted to the axle device 1A via the transmission device 1B. The transmission device 1B rotates a drive shaft 3. The drive shaft 3 applies a rotational force to the axle device 1A. The axle device 1A transmits the motive power of the power source 70, which is supplied via the transmission device 1B and the drive shaft 3, to the rear wheels 150R. The rear wheels 150R rotate about the rotation axis AX by the supplied motive power. Thus, the travel device 130 travels.

Further, the dump truck 100 includes a rotational speed sensor 410, a pressure sensor 420, an accelerator opening sensor 430, a steering angle sensor 440, a position sensor 60, a notification device 80, a communication device 180, a control device 200, and a vibration analysis device 300.

The rotational speed sensor 410 detects a rotational speed N of the drive shaft 3 per unit time, the drive shaft 3 applying a rotational force to the axle device 1A. A rotational speed which is the rotational speed N of the drive shaft 3 per unit time is detected, whereby a travel speed V of the dump truck 100 is detected.

The pressure sensor 420 detects the pressure P of the hydraulic oil sealed in the suspension cylinder 161. The pressure sensor 420 detects the pressure P of the hydraulic oil in the suspension cylinder 161, and detects a load acting on the suspension cylinder 161. The pressure P of the hydraulic oil in the suspension cylinder 161 fluctuates according to the uneven state of the road surface on which the travel device 130 travels. The pressure sensor 420 functions as a road surface state sensor that detects the uneven state of the road surface. The pressure P of the hydraulic oil in the suspension cylinder 161 is detected, whereby the uneven state of the road surface is detected.

Further, the pressure P of the hydraulic oil in the suspension cylinder 161 fluctuates according to a weight of the load loaded on the dump body 120. The pressure sensor 420 functions as a load sensor that detects the weight of the load loaded on the dump body 120.

The accelerator opening sensor 430 detects an operation amount (depression amount) of an accelerator pedal 73. An accelerator opening W (throttle opening) of a throttle valve of the power source 70 is adjusted based on the operation amount of the accelerator pedal 73. The accelerator pedal 73 functions as an operating device that adjusts an output of the power source 70 that drives the rotating machine 1. An operation amount of the operating device includes the accelerator opening W. The accelerator opening W is adjusted, whereby the output of the power source 70 that drives the rotating machine 1 is adjusted.

The steering angle sensor 440 detects a steering angle θ of the steering device 170. When the operation angle θ is 0 [°], the travel device 130 goes straight. When the steering angle θ increases, the travel device 130 turns. The steering angle θ of the steering device 170 is detected, whereby whether the travel device 130 is traveling straight or turning is detected.

The position sensor 60 detects an absolute position indicating a position of the dump truck 100 in a global coordinate system by using a global navigation satellite system (GNSS). An example of the global navigation satellite system is a global positioning system (GPS). The position sensor 60 includes a GPS receiver.

The notification device 80 is mounted on the dump truck 100. The notification device 80 is disposed in the driver's cab and notifies the driver of data. The notification device 80 includes at least one of a display device, a light emitting device, and a sound output device. The display device includes a flat panel display such as a liquid crystal display (LCD) and an organic electroluminescence display (OELD). The light emitting device includes a light source such as a light emitting diode (LED). The sound output device includes a siren or a voice output device, which is capable of generating a warning sound. The notification device notifies the driver of data by using at least one of display data displayed on the display device, light emitted from the light emitting device, and a sound output from the sound output device.

The communication device 180 is capable of communicating with an external device. The communication device 180 is connected to the control device 200.

[Rotating Machine]

Figure 3:
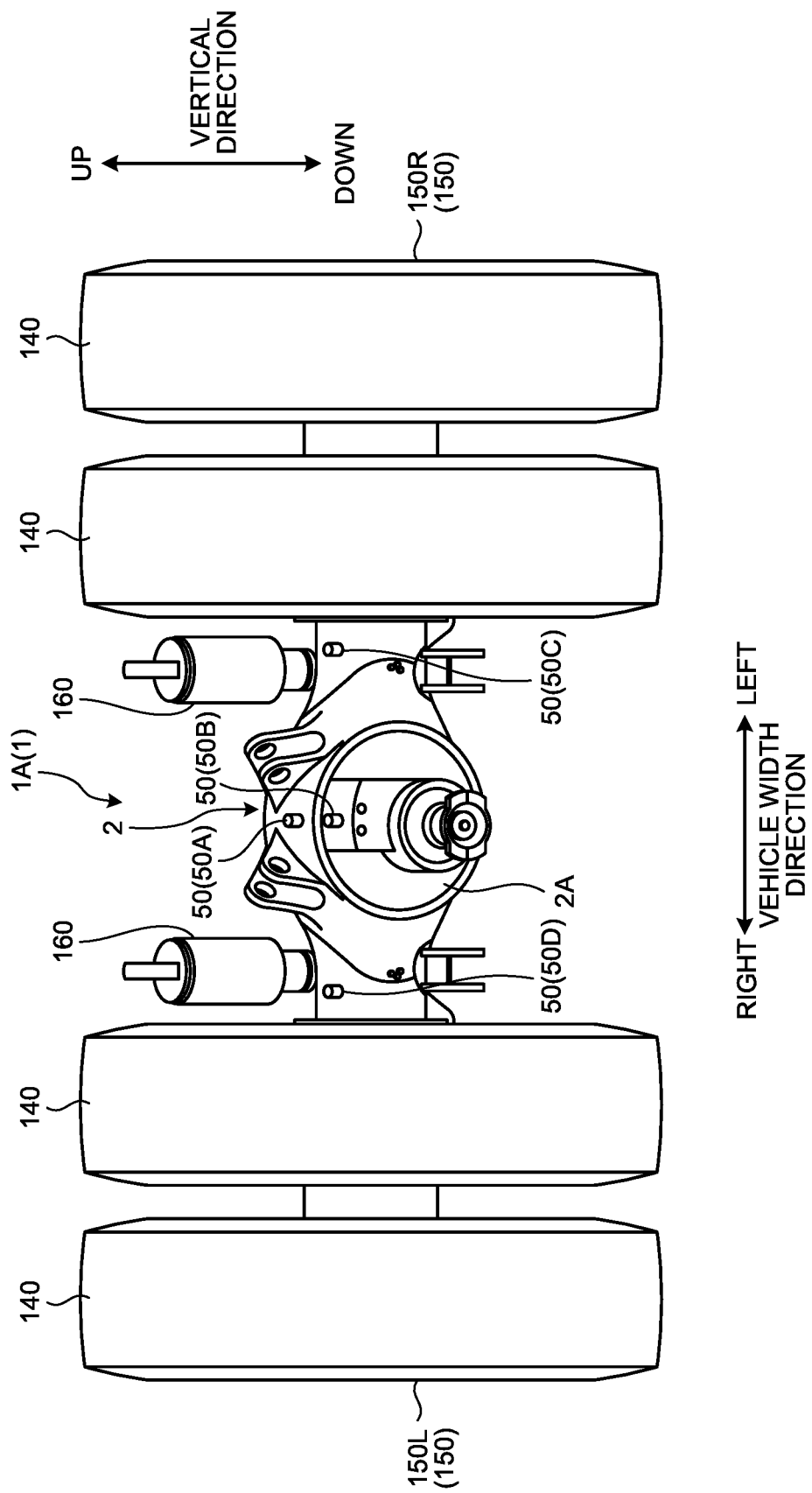
FIG. 3 is a view of a part of a rotating machine according to the present embodiment as seen from the rear.
Figure 4:
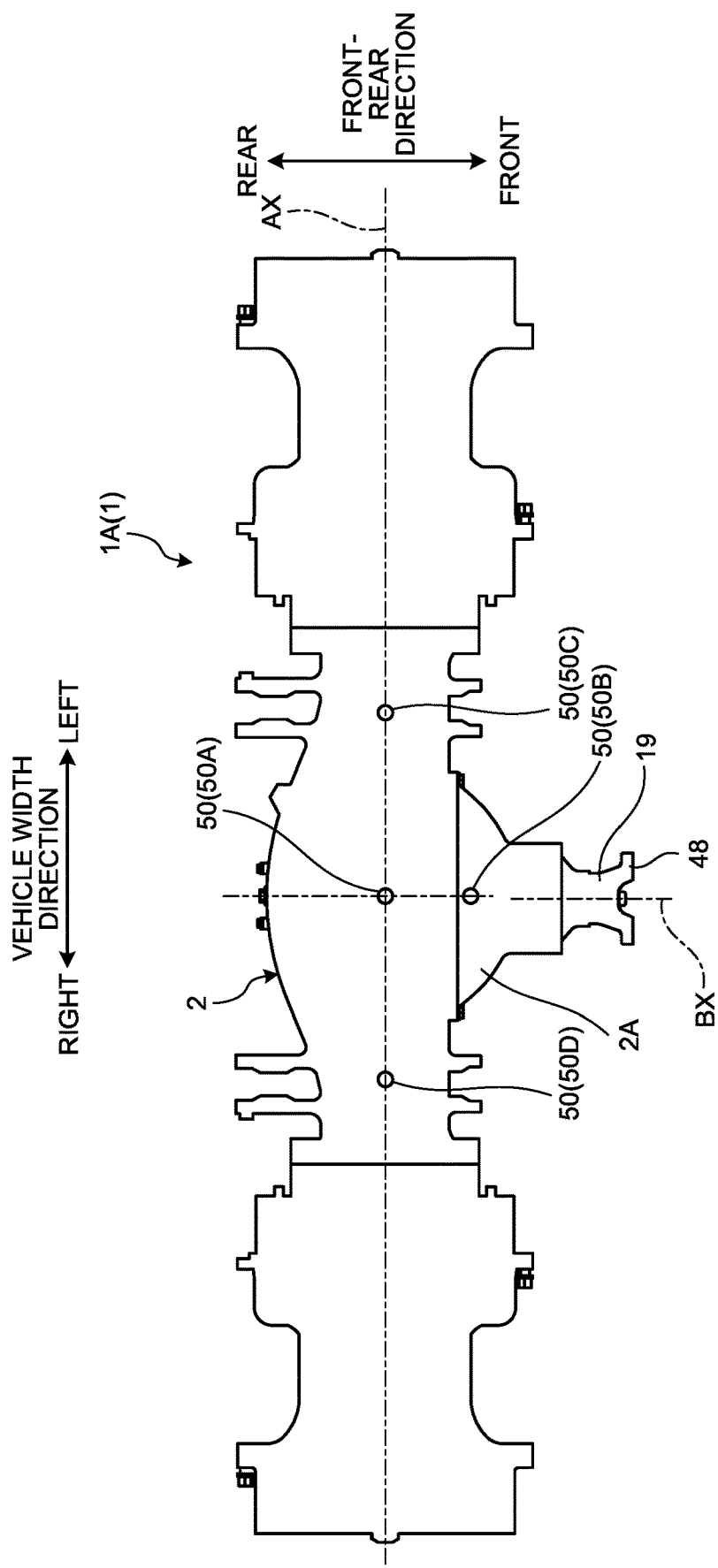
FIG. 4 is a plan view illustrating the example of the rotating machine according to the present embodiment.

FIG. 3 is a view of a part of the axle device 1A according to the present embodiment as seen from the rear. FIG. 4 is a plan view illustrating the example of the axle device 1A according the embodiment of the present invention. In the present embodiment, the axle device 1A is a rear axle that drives the rear wheels 150R. The axle device 1A includes an axle housing 2. The axle housing 2 is a tubular member. Pluralities of machine parts such as a gears 10 or bearings 20 are housed in the internal space of the axle housing 2.

The axle housing 2 is supported by the vehicle body frame 110 via the suspension devices 160. Vibration sensors 50 are provided on the axle housing 2. A plurality of the vibration sensors 50 are provided on the outer surface of the axle housing 2. The plurality of vibration sensors 50 are provided on the upper surface of the axle housing 2 at intervals. The vibration sensors 50 are provided on the axle housing 2 so as to detect a vibration in the vertical direction.

In the present embodiment, the vibration sensors 50 provided on the axle housing 2 include four vibration sensors 50A, 50B, 50C, and 50D. The vibration sensor 50A is provided at the center of the upper surface of the axle housing 2 in the vehicle width direction and the center thereof in the front-rear direction. The vibration sensor 50B is provided at the center of the upper surface of the axle housing 2 in the vehicle width direction and in front of the vibration sensor 50A. The vibration sensor 50C is provided at the center of the upper surface of the axle housing 2 in the front-rear direction and to the left of the vibration sensor 50A. The vibration sensor 50D is provided at the center of the upper surface of the axle housing 2 in the front-rear direction and to the right of the vibration sensor 50A. The number of vibration sensors 50 provided on the axle housing 2 may be two or three, or may be any number of five or more. The number of vibration sensors 50 provided on the axle housing 2 may be one.

As illustrated in FIG. 4, the axle device 1A includes the axle housing 2, a differential disposed in an internal space 2H of the axle housing 2 and coupled to the drive shaft 3, and an axle shaft to which the rotational force of the drive shaft 3 is transmitted via the differential 4. The axle shaft rotates, whereby the rear wheels 150R of the travel device 130 rotate.

The axle housing 2 includes a differential body 2A that houses the differential 4, and side bodies 2B individually connected to right and left portions of the differential body 2A.

The drive shaft 3 rotates by a driving force generated by the engine. The drive shaft 3 extends in the front-rear direction and rotates about a rotation axis BX. The rotation axis BX extends in the front-rear direction.

The motive power generated by the power source 70 is transmitted to the axle device 1A via the transmission device 1B and the drive shaft 3.

When the drive shaft 3 rotates about the rotation axis BX, the axle shaft rotates about the rotation axis AX. The rotation axis AX extends in the vehicle width direction. The rotation axis AX and the rotation axis BX are substantially orthogonal to each other. When the axle shaft rotates about the rotation axis AX, the rear wheels 150R connected to the axle shaft rotate about the rotation axis AX.

[State Detection System]

Figure 5:
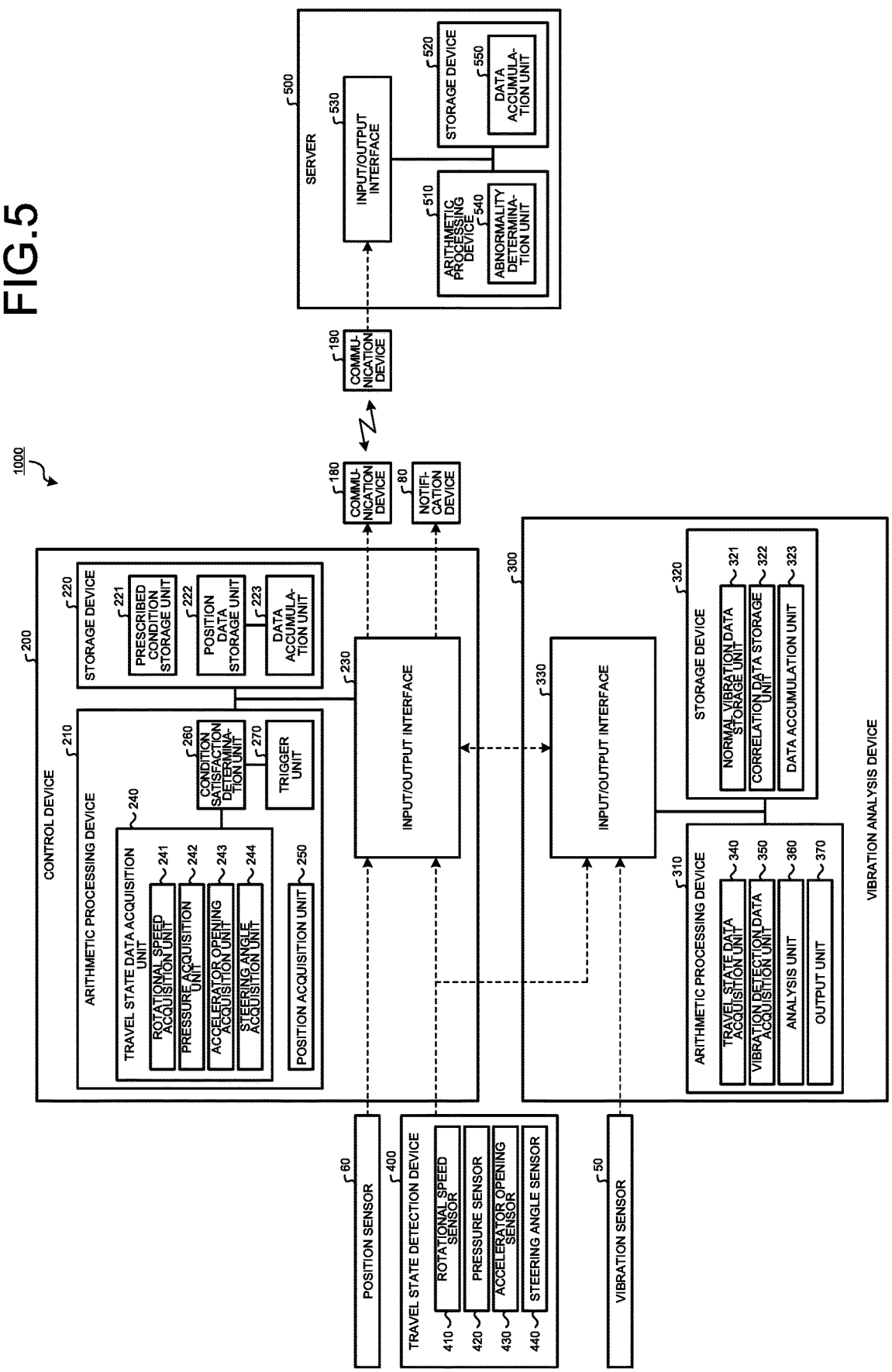
FIG. 5 is a functional block diagram illustrating an example of a state detection system according to the present embodiment.

FIG. 5 is a functional block diagram illustrating an example of a state detection system 1000 according to the present embodiment. As illustrated in FIG. 5, the state detection system 1000 includes the control device 200, the vibration analysis device 300, a travel state detection device 400, and the vibration sensor 50.

The state detection system 1000 also includes the position sensor 60, the notification device 80, and the communication device 180. The state detection system 1000 is capable of communicating with a server 500 via the communication device 180 and a communication device 190.

The state detection system 1000 is provided on the dump truck 100. The server 500 is provided outside the dump truck 100.

The communication device 190 is connected to the server 500. The communication device 180 of the state detection system 1000 and the communication device 190 of the server 500 communicate with each other via a communication network. The communication network includes the Internet. The communication network may include a mobile phone communication network.

The control device 200 includes a computer system. The control device 200 includes an arithmetic processing device 210 including a processor such as a central processing unit (CPU), a storage device 220 including a volatile memory such as a random access memory (RAM) and a non-volatile memory such as a read only memory (ROM), and an input/output interface 230.

The vibration analysis device 300 includes a computer system. The vibration analysis device 300 includes an arithmetic processing device 310 including a processor such as a CPU, a storage device 320 including a volatile memory such as a RAM and a non-volatile memory such as a ROM, and an input/output interface 330.

The server 500 includes a computer system. The server 500 includes an arithmetic processing device 510 including a processor such as a CPU, a storage device 520 including a volatile memory such as RAM and a non-volatile memory such as ROM, and an input/output interface 530.

The input/output interface 230 of the control device 200 includes an interface circuit that connects the arithmetic processing device 210 and the storage device 220 to such external devices. The vibration analysis device 300, the travel state detection device 400, the position sensor 60, the notification device 80, and the communication device 180 are connected to the input/output interface 230.

The input/output interface 330 of the vibration analysis device 300 includes an interface circuit that connects the arithmetic processing device 310 and the storage device 320 to such external devices. The control device 200, the travel state detection device 400, and the vibration sensor 50 are connected to the input/output interface 330.

The input/output interface 530 of the server 500 includes an interface circuit that connects the arithmetic processing device 510 and the storage device 520 to such an external device. The communication device 190 is connected to the input/output interface 530.

The travel state detection device 400 is provided in the dump truck 100. The travel state detection device 400 detects a travel state of the dump truck 100. In the present embodiment, the travel state detection device 400 includes the rotational speed sensor 410, the pressure sensor 420, the accelerator opening sensor 430, and the steering angle sensor 440.

The travel state of the dump truck 100, which is detected by the travel state detection device 400, includes at least one of: the rotational speed of the drive shaft 3 per unit time, which is detected by the rotational speed sensor 410; the pressure of the suspension cylinder 161, which is detected by the pressure sensor 420; the accelerator opening that adjusts the output of the power source 70, the accelerator opening being detected by the accelerator opening sensor 430; and the steering angle of the steering device 170, which is detected by the steering angle sensor 440.

The vibration sensor 50 is provided in the axle housing 2 of the axle device 1A. The vibration sensor 50 detects the vibration of the axle device 1A.

The arithmetic processing device 210 of the control device 200 includes: a travel state data acquisition unit 240 that acquires travel state data indicating a travel state of the dump truck 100; a position acquisition unit 250 that acquires position data indicating the position of the dump truck 100; a condition satisfaction determination unit 260 that determines whether or not the travel state of the dump truck 100 satisfies prescribed conditions; and a trigger unit 270 that outputs a trigger signal to the vibration analysis device 300.

The storage device 220 of the control device 200 includes a prescribed condition storage unit 221, a position data storage unit 222, and a data accumulation unit 223.

The travel state data acquisition unit 240 acquires travel state data from the travel state detection device 400. The travel state data acquisition unit 240 includes a rotational speed acquisition unit 241 that acquires the rotational speed N of the drive shaft 3 from the rotational speed sensor 410, a pressure acquisition unit 242 that acquires the pressure P of the suspension cylinder 161 from the pressure sensor 420, and an accelerator opening acquisition unit 243 that acquires the accelerator opening W from the accelerator opening sensor 430, and a steering angle acquisition unit 244 that acquires the steering angle θ of the steering device 170 from the steering angle sensor 440.

The position acquisition unit 250 acquires the position of the dump truck 100 from the position sensor 60.

The prescribed condition storage unit 221 stores prescribed conditions regarding the travel state of the dump truck 100. The prescribed conditions define the travel state of the dump truck 100 in which a state of the axle device 1A can be detected while a disturbance is suppressed when the vibration sensor 50 detects the vibration of the axle device 1A. The matter that the travel state of the dump truck 100 satisfies the prescribed conditions means that the vibration sensor 50 can accurately detect the vibration of the axle device 1A while the disturbance applied to the vibration sensor 50 is suppressed.

The position data storage unit 222 stores position data indicating the position of the dump truck 100 when the travel state satisfies the prescribed conditions based on the position of the dump truck 100, which is acquired by the position acquisition unit 250, and based on a travel state of the dump truck 100, which is acquired by the travel state data acquisition unit 240 when the dump truck 100 travels at the position acquired by the position acquisition unit 250. The position data storage unit 222 stores the position of the dump truck 100 when the dump truck 100 travels while satisfying the prescribed conditions.

The data accumulation unit 223 stores the travel state data acquired by the travel state data acquisition unit 240 and the vibration detection data of the vibration sensor 50.

The condition satisfaction determination unit 260 determines whether or not the travel state acquired by the travel state data acquisition unit 240 satisfies the prescribed conditions based on the prescribed conditions stored in the prescribed condition storage unit 221. The condition satisfaction determination unit 260 outputs determination data to the vibration analysis device 300.

The trigger unit 270 outputs the trigger signal for starting a vibration analysis to the vibration analysis device 300 when the state in which the travel state satisfies the prescribed conditions is maintained for a prescribed time. In the present embodiment, the prescribed time is, for example, five [seconds].

The arithmetic processing device 310 of the vibration analysis device 300 includes: a travel state data acquisition unit 340 that acquires the travel state data indicating the travel state of the dump truck 100; a vibration detection data acquisition unit 350 that acquires the vibration detection data indicating the detection value of the vibration sensor 50; an analysis unit 360 that analyzes the state of the axle device 1A when the vibration detection data acquisition unit 350 acquires the vibration detection data; and an output unit 370 that outputs an analysis result of the analysis unit 360.

The storage device 320 of the vibration analysis device 300 includes a normal vibration data storage unit 321, a correlation data storage unit 322, and a data accumulation unit 323.

The travel state data acquisition unit 340 acquires the travel state data from the travel state detection device 400. The travel state data acquisition unit 340 of the vibration analysis device 300 has the same function as the travel state data acquisition unit 240 of the control device 200.

The normal vibration data storage unit 321 stores normal vibration data indicating a detection value of the vibration sensor 50 when the axle device 1A is normal and the travel state of the dump truck 100 satisfies the prescribed conditions. The matter that the axle device 1A is normal means that each of the machine parts of the axle device 1A is normal, and includes a state in which the machine part of the axle device 1A does not deteriorate, a state in which a surface thereof is not peeled, and a state in which the machine part is not broken. For example, when the axle device 1A is new, the axle device 1A is normal. For example, the normal vibration data is collected when the axle device 1A is new and the dump truck 100 travels under the prescribed conditions, and is stored in the normal vibration data storage unit 321. The matter that the axle device 1A is normal is not limited to the matter that the axle device 1A is new.

The correlation data storage unit 322 stores correlation data indicating a relationship between the rotational speed N of the drive shaft 3 and vibration characteristics of the axle device 1A when the machine part of the axle device 1A is abnormal. The correlation data is used when an abnormal machine part is specified from among the plurality of machine parts of the axle device 1A.

The data accumulation unit 323 stores the travel state data acquired by the travel state data acquisition unit 340 and the vibration detection data of the vibration sensor 50.

The vibration detection data acquisition unit 350 acquires, from the vibration sensor 50, the vibration detection data indicating the detection value of the vibration sensor 50. In the present embodiment, the vibration detection data acquisition unit 350 acquires the vibration detection data of the vibration sensor 50 when the travel state of the dump truck 100 satisfies the prescribed conditions. The determination data of the condition satisfaction determination unit 260 is supplied to the vibration detection data acquisition unit 350. The vibration detection data acquisition unit 350 acquires vibration detection data of the vibration sensor 50 when the condition satisfaction determination unit 260 determines that the travel state of the dump truck 100 satisfies the prescribed conditions, and stores the vibration detection data in the data accumulation unit 323.

The analysis unit 360 analyzes a state of the axle device 1A when the vibration detection data acquisition unit 350 acquires the vibration detection data based on the normal vibration data stored in the normal vibration data storage unit 321, and based on the vibration detection data acquired by the vibration detection data acquisition unit 350.

The vibration detection data is vibration waveform data detected by the vibration sensor 50 when the travel state satisfies the prescribed conditions. The normal vibration data is also vibration waveform data detected by the vibration sensor 50 when the travel state satisfies the prescribed conditions. That is, the travel state of the dump truck 100 when the vibration detection data is acquired and the travel state of the dump truck 100 when the normal vibration data is acquired are the same conditions (prescribed conditions).

When the machine part of the axle device 1A is normal when the vibration detection data is acquired, the vibration detection data is substantially equal to the normal vibration data. Meanwhile, when the machine part of the axle device 1A is abnormal when the vibration detection data is acquired, the vibration detection data is different from the normal vibration data. That is, when the axle device 1A is normal, the vibration detection data and normal vibration data are substantially equal to each other, and when the axle device 1A is abnormal, the vibration detection data and normal vibration data are different from each other. The matter that the axle device 1A is abnormal means that the machine part of the axle device 1A is abnormal, and includes at least one of a state in which the machine part of the axle device 1A deteriorates, a state in which a surface thereof is peeled, and a state in which the machine part is broken.

The analysis unit 360 compares the normal vibration data stored in the normal vibration data storage unit 321 and the vibration detection data acquired by the vibration detection data acquisition unit 350 with each other, and can thereby determine whether the axle device 1A is abnormal.

Further, the analysis unit 360 can specify the abnormal machine part based on the correlation data stored in the correlation data storage unit 322, and based on the vibration detection data acquired by the vibration detection data acquisition unit 350.

The output unit 370 outputs the analysis result of the analysis unit 360. In the present embodiment, the output unit 370 outputs the analysis result to the data accumulation unit 323. The data accumulation unit 323 stores the analysis result. The output unit 370 also outputs the analysis result to the control device 200. The data accumulation unit 223 of the control device 200 stores the analysis result. The control device 200 also outputs the analysis result to the notification device 80. The control device 200 also transmits the analysis result to the server 500 via the communication device 180. The output unit 370 may output the analysis result to the notification device 80 or the server 500 without the control device 200.

[Prescribed Conditions]

Next, the prescribed conditions will be described. The prescribed condition storage unit 221 stores the prescribed conditions regarding the travel state of the dump truck 100. The prescribed conditions define the travel state of the dump truck 100 in which a state of the axle device 1A can be detected while a disturbance is suppressed when the vibration sensor 50 detects the vibration of the axle device 1A.

Figures 6, 7:
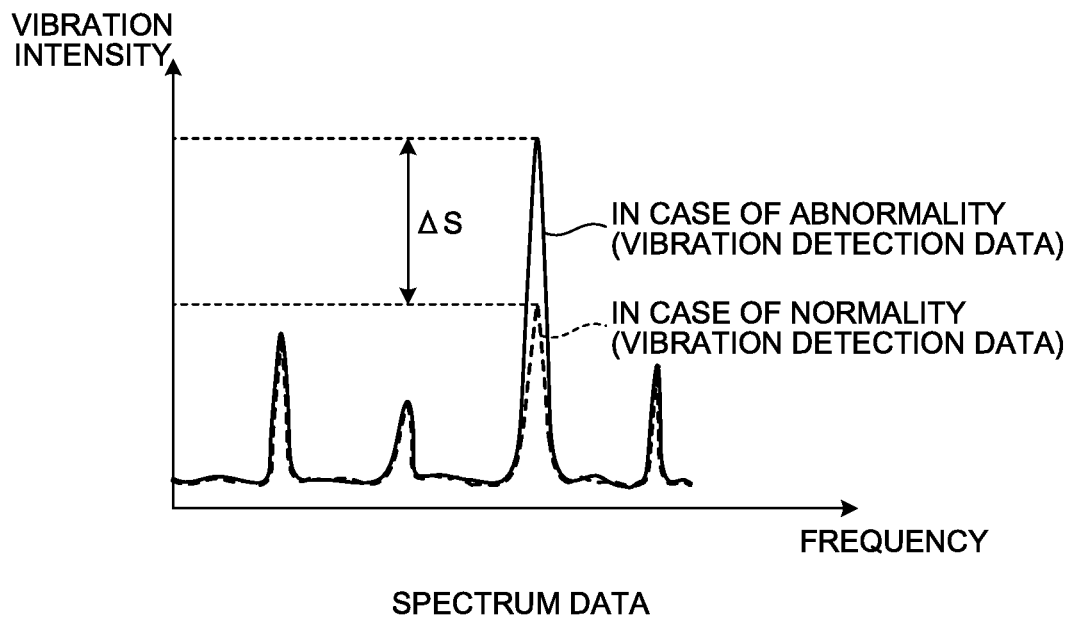
FIG. 6 is a diagram illustrating an example of prescribed conditions according to the present embodiment.
FIG. 7 is a graph illustrating vibration spectrum characteristics of normal vibration data and vibration detection data according to the present embodiment.

FIG. 6 is a diagram illustrating an example of the prescribed conditions according to the present embodiment. As illustrated in FIG. 6, the prescribed conditions include: a prescribed condition regarding the rotational speed N of the drive shaft 3; a prescribed condition regarding the pressure P of the suspension cylinder 161; a prescribed condition regarding the accelerator opening W; and a prescribed condition regarding the steering angle θ of the steering device 170.

The prescribed condition regarding the rotational speed N of the drive shaft 3 includes that the rotational speed N of the drive shaft 3 per unit time is equal to or greater than a prescribed rotational speed Nr. When the rotational speed N of the drive shaft 3, which is detected by the rotational speed sensor 410, is equal to or greater than the prescribed rotational speed Nr, the prescribed condition is satisfied, and when the rotational speed N is less than the prescribed rotational speed Nr, the prescribed condition is not satisfied.

When the axle device 1A is not operating, the axle device 1A does not vibrate in the first place. Even if the vibration sensor 50 detects the vibration of the axle device 1A, it is difficult to determine whether or not the machine part is abnormal from the vibration detection data of the vibration sensor 50. In order to determine whether or not the machine part is abnormal, it is necessary to detect the vibration while the axle device 1A is operating. Hence, when the vibration is detected, the rotational speed N of the drive shaft 3 needs to be equal to or greater than the prescribed rotational speed Nr.

The rotational speed N of the drive shaft 3 corresponds to the travel speed V of the dump truck 100. Therefore, the prescribed conditions may include that the travel speed V of the dump truck 100 is equal to or greater than a prescribed travel speed Vr. When the travel speed V of the dump truck 100 is equal to or greater than the prescribed travel speed Vr, the prescribed condition is satisfied, and when the travel speed V is less than the prescribed travel speed Vr, the prescribed condition is not satisfied.

The prescribed condition regarding the rotational speed N of the drive shaft 3 includes that a fluctuation amount ΔN of the rotational speed N of the drive shaft 3 per unit time is within a first fluctuation range±ΔNr. When the fluctuation amount ΔN derived from the detection data of the rotational speed sensor 410 is within the first fluctuation range±ΔNr, the prescribed condition is satisfied, and when the fluctuation amount ΔN is out of the first variation range±ΔNr, the prescribed condition is not satisfied.

The matter that the fluctuation amount ΔN is large means that a fluctuation amount ΔV of the travel speed V of the dump truck 100 per unit time is large. That is, the matter that the fluctuation amount ΔN is large means that the dump truck 100 repeats acceleration or deceleration. When the fluctuation amount ΔV of the travel speed V is large, the vibration characteristics of the axle device 1A change, and accordingly, accuracy of a result of vibration analysis performed based on the vibration detection data of the vibration sensor 50 may decrease. Hence, when the vibration of the axle device 1A is detected, the fluctuation amount ΔN of the rotational speed N of the drive shaft 3 needs to remain within the first fluctuation range±ΔNr, that is, the fluctuation amount ΔV of the travel speed V of the dump truck 100 needs to remain within the first fluctuation range±ΔVr.

The prescribed condition regarding the pressure P of the suspension cylinder 161 includes that a fluctuation amount ΔP of the pressure P of the suspension cylinder 161 per unit time is within a second fluctuation range±ΔPr. When the fluctuation amount ΔP derived from the detection data of the pressure sensor 420 is within the second fluctuation range±ΔPr [%], the prescribed condition is satisfied, and when the fluctuation amount ΔP is out of the second fluctuation range±Pr [%], the prescribed condition is not satisfied.

The matter that the fluctuation amount ΔP is large means that the road surface on which the dump truck 100 travels is highly uneven. When the dump truck 100 travels on the road surface where the unevenness is severe, the vibration characteristics of the axle device 1A change, and accordingly, the accuracy of the result of the vibration analysis performed based on the detection data of the vibration sensor 50 may decrease. Hence, when the vibration of the axle device 1A is detected, the fluctuation amount ΔP of the pressure P of the suspension cylinder 161 needs to remain within the second fluctuation range±ΔPr.

The prescribed condition regarding the accelerator opening W includes that the accelerator opening W is equal to or greater than a prescribed accelerator opening Wr (prescribed adjustment amount). When the accelerator opening W detected by the accelerator opening sensor 430 is equal to or more than the prescribed accelerator opening Wr [%], the prescribed condition is satisfied, and when the accelerator opening W is less than the prescribed accelerator opening Wr [%], the prescribed condition is not satisfied.

When the accelerator pedal 73 is operated and the drive shaft 3 rotates, the gears 10 of the axle device 1A also rotate. When a gear 10A and a gear 10B mesh with each other and the gear 10A rotates, a front tooth surface of the gear 10A and a rear tooth surface of the gear 10B come into contact with each other. Meanwhile, when the accelerator pedal 73 is not operated and is in a so-called engine brake state, a backlash (play between gears) causes the front tooth surface of the gear 10A and the rear tooth surface of the gear 10B to separate from each other, or a rear tooth surface of the gear 10A and a front tooth surface of the gear 10B to come into contact with each other. That is, a contact state of the tooth surfaces of the gears 10 changes based on whether or not the accelerator pedal 73 is operated or based on the amount of operation thereof. When the contact state of the tooth surfaces of the gears 10 changes, the vibration characteristics of the axle device 1A change, and accordingly, the accuracy of the result of the vibration analysis performed based on the detection data of the vibration sensor 50 may decrease. Hence, when the vibration of the axle device 1A is detected, the accelerator opening W needs to be equal to or greater than the prescribed accelerator opening Wr in order to reduce an effect of the backlash and to constantly maintain the contact state of the tooth surfaces of the gears 10.

The prescribed condition regarding the steering angle θ of the steering device 170 includes that the steering angle θ remains within a prescribed steering angle±θr. When the steering angle θ of the steering device 170, which is detected by the steering angle sensor 440, remains within the prescribed steering angle±θr, the prescribed condition is satisfied, and when the steering angle θ is out of the prescribed steering angle±θr, the prescribed condition is not satisfied.

The matter that the steering angle θ is small means that the dump truck 100 is traveling straight, and the matter that the steering angle θ is large means that the dump truck 100 is turning. The vibration of the axle device 1A is preferably detected under certain conditions. Further, when the dump truck 100 is turning, a difference occurs between a rotational speed of the right gear 10 and a rotational speed of the left gear 10 in the vehicle width direction due to an action of the differential 4, and the vibration characteristics of the axle device 1A change. Accordingly, the accuracy of result of the vibration analysis performed based on the detection data of the vibration sensor 50 may decrease. Hence, when the vibration of the axle device 1A is detected, the steering angle θ needs to remain within the prescribed steering angle±θr, that is, the dump truck 100 needs to be traveling substantially straight.

[Vibration Analysis]

FIG. 7 is a diagram illustrating vibration spectrum characteristics of normal vibration data and vibration detection data according to the present embodiment. FIG. 7 illustrates vibration spectra acquired by performing a fast Fourier transform individually for the normal vibration data and the vibration detection data. In FIG. 7, a horizontal axis represents frequency and a vertical axis represents vibration intensity.

As illustrated in FIG. 7, the acquired vibration spectra are different between when the machine part is normal and when the machine part is abnormal. In the present embodiment, the analysis unit 360 determines that the machine part is abnormal when a difference ΔS between a peak value of the vibration spectrum, which is calculated based on the normal vibration data, and a peak value of the vibration spectrum, which is calculated based on the vibration detection data, is equal to or greater than a predetermined threshold value.

In the present embodiment, the analysis unit 360 not only determines whether or not the machine part is abnormal but also specifies such an abnormal machine part. The analysis unit 360 specifies the abnormal machine part based on the correlation data stored in the correlation data storage unit 322.

FIG. 8 is a table illustrating an example of correlation data according to the present embodiment. As illustrated in FIG. 8, the correlation data storage unit 322 stores correlation data indicating relationships between the rotational speed No of the drive shaft 3 and the vibration characteristics of the axle device 1A, which are detected by the vibration sensor 50 when the machine part is abnormal. The correlation data is derived by, for example, a simulation performed based on design data of the axle device 1A. The design data of the axle device 1A includes shape data of the gears 10, such as a cutting edge diameter, a reference diameter, and the number of teeth, and shape data of the bearings 20, such as a size of each inner ring.

For example, when an inner ring of the first bearing is abnormal and the drive shaft 3 rotates at the prescribed rotational speed No, the axle device 1A vibrates with a first vibration characteristic. In the example illustrated in FIG. 8, when the drive shaft 3 rotates at the rotational speed No when the inner ring of the first bearing is abnormal, a vibration of a frequency Nb1 [Hz] is detected most significantly.

Further, when an outer ring of the first bearing is abnormal and the drive shaft 3 rotates at the rotational speed No, the axle device 1A vibrates with a second vibration characteristic. In the example illustrated in FIG. 8, a vibration of a frequency Nb2 [Hz] is detected most significantly.

Likewise, when an inner ring of a second bearing is abnormal, a vibration of a frequency Nb3 [Hz] is detected significantly, and when an outer ring of the second bearing is abnormal, a vibration of a frequency Nb4 [Hz] is detected significantly.

Further, when the first gear is abnormal (tooth lack), the vibration of the frequency Ng1 [Hz] is detected most significantly, when the first gear is abnormal (causes tooth surface wear), the vibration of the frequency Ng2 [Hz] is detected most significantly, when the second gear is abnormal (causes tooth lack), the vibration of the frequency Ng3 [Hz] is detected most significantly, and when the second gear is abnormal (causes tooth surface wear), the vibration of the frequency Ng4 [Hz] is detected most significantly.

As described above, the vibration characteristics of the axle device 1A change based on the machine part in which the abnormality has occurred. The correlation data indicating the vibration characteristics of the axle device 1A, which change based on the machine part in which the abnormality has occurred is derived in advance by simulation and is stored in the correlation data storage unit 322. The correlation data may be derived by an actual experiment.

The analysis unit 360 can specify the abnormal machine part based on the correlation data stored in the correlation data storage unit 322 and the vibration detection data detected by the vibration sensor 50. For example, when the vibration sensor 50 detects the vibration of the frequency Nb1 [Hz] most significantly, the analysis unit 360 determines that the inner ring of the first bearing is abnormal. Further, when the vibration sensor 50 detects the vibration of the frequency Ng1 [Hz] most significantly, the analysis unit 360 determines that the first gear is abnormal (causes tooth lack).

The correlation data illustrated in FIG. 8 is an example. Actually, the correlation data is derived for each of the plurality of rotational speeds N. Further, correlation data based on various parameters are derived, the correlation data including correlation data about a frequency of an acceleration component of the vibration, correlation data about a frequency of a velocity component of the vibration, and correlation data about a frequency of a displacement component of the vibration.

[State Detection Method]

FIGS. 9 and 10 are flowcharts illustrating an example of a state detection method according to the present embodiment. Steps SA1 to SA8 illustrated in FIG. 9 are processing of the control device 200, and Steps SB1 to SB8 illustrated in FIG. 10 are processing of the vibration analysis device 300.

The processing of the control device 200 will be described with reference to FIG. 9. The travel state data acquisition unit 240 of the control device 200 acquires the travel state data, which indicates the travel state of the dump truck 100, from the travel state detection device 400 (Step SA1).

The condition satisfaction determination unit 260 determines whether or not the travel state acquired by the travel state data acquisition unit 240 satisfies the prescribed conditions stored in the prescribed condition storage unit 221 (Step SA2).

When it is determined in Step SA2 that the travel state does not satisfy the prescribed conditions (Step SA2: No), the processing returns to Step SA1, where the travel state data acquisition unit 240 continues to acquire the travel state data.

In Step SA2, when it is determined that the travel state satisfies the prescribed conditions (Step SA2: Yes), the trigger unit 270 determines whether or not the elapsed time from the point of time when it is first determined that the prescribed conditions are satisfied exceeds a prescribed time that is predetermined (step SA3).

In Step SA3, when it is determined that the elapsed time does not exceed a prescribed time (Step SA3: No), the process returns to Step SA1, where the travel state data acquisition unit 240 continues to acquire the travel state data, and the trigger unit 270 determines whether or not the elapsed time from the point of time when the travel state satisfies the prescribed conditions exceeds the prescribed time.

When it is determined in Step SA3 that the elapsed time exceeds the prescribed time (Step SA3: Yes), the trigger unit 270 outputs a trigger signal to the analysis unit 360 (Step SA4). That is, the trigger unit 270 outputs the trigger signal to the analysis unit 360 when it is determined that a state in which the travel state of the dump truck 100 satisfies the prescribed conditions is maintained for the prescribed time.

As will be described later, the output unit 370 of the vibration analysis device 300 outputs an analysis result indicating that the machine part is abnormal and an analysis result indicating the machine part specified as abnormal. The input/output interface 230 of the control device 200 acquires the analysis results output from the vibration analysis device 300 (Step SA5). This means acquisition of the analysis results of Step SB5 illustrated in FIG. 10

The input/output interface 230 outputs the analysis results to the notification device 80. The notification device 80 notifies the driver of the dump truck 100 of the analysis results (Step SA6). When the analysis unit 360 determines that the machine part is abnormal, if the notification device 80 includes a display device, then the notification device 80 displays display data indicating that the machine part is abnormal. When the notification device 80 includes a sound output device, the notification device 80 outputs a sound indicating that the machine part is abnormal. The notification device 80 may display data indicating that the machine part is normal, or may output a sound indicating that the machine part is normal.

The input/output interface 230 also outputs the analysis results to the data accumulation unit 223. The data accumulation unit 223 stores the analysis results (Step SA7).

The input/output interface 230 also outputs the analysis results to the communication device 180. The communication device 180 transmits the analysis results to the server 500 (Step SA8).

An abnormality determination unit 540 of the arithmetic processing device 510 determines whether or not the axle device 1A of the dump truck 100 is abnormal based on the analysis results. Further, the analysis results of the axle device 1A are transmitted to the server 500 from each of a plurality of the dump trucks 100. The abnormality determination unit 540 determines whether or not each of the axle devices 1A of the plurality of dump trucks 100 is abnormal. Analysis results of the plurality of axle devices 1A and determination results of abnormalities thereof are stored in a data accumulation unit 550 of the storage device 520. A maintainer of the dump truck 100 can maintain the dump truck 100 based on the analysis results or such abnormality determination results, which are stored in the data accumulation unit 550.

In the present embodiment, processing (Step SA6) of the notification device 80 for notifying the driver of the dump truck 100 of the analysis results may be omitted.

Next, the processing of the vibration analysis device 300 will be described with reference to FIG. 10. Like the travel state data acquisition unit 240 of the control device 200, the travel state data acquisition unit 340 of the vibration analysis device 300 also acquires travel state data, which indicates the travel state of the dump truck 100, from the travel state detection device 400. The travel state data acquired by the travel state data acquisition unit 240 and the travel state data acquired by the travel state data acquisition unit 340 are the same data. Further, the vibration detection data acquisition unit 350 of the vibration analysis device 300 acquires the vibration detection data of the axle device 1A from the vibration sensor 50 (Step SB1).

The data accumulation unit 323 stores the vibration detection data acquired by the vibration detection data acquisition unit 350 (Step SB2). The data accumulation unit 323 sequentially stores a plurality of vibration detection data in accordance with the elapsed time.

When the state in which the travel state satisfies the prescribed conditions is maintained for the prescribed time, the analysis unit 360 acquires the trigger signal output from the trigger unit 270. As mentioned above, the trigger unit 270 outputs the trigger signal to the analysis unit 360 (Step SA4). The analysis unit 360 acquires, from the data accumulation unit 323, vibration detection data acquired during a period between a current point of time tn when the trigger signal is acquired and a preceding point of time ta, which is a time preceding by a prescribed time from the current point of time tn (Step SB3).

Further, the analysis unit 360 acquires the normal vibration data from the normal vibration data storage unit 321 (Step SB4).

The analysis unit 360 analyzes the state of the axle device 1A based on the vibration detection data acquired from the data accumulation unit 323 during the period between the current point of time to and the preceding point of time ta. Based on the normal vibration data stored in the normal vibration data storage unit 321 and the vibration detection data acquired in Step SB3, the analysis unit 360 analyzes the state of the axle device 1A at the time when the travel state data acquisition unit 340 acquires the vibration detection data during the prescribed time while the travel state satisfies the prescribed conditions (Step SB5).

As described with reference to FIG. 7, the analysis unit 360 calculates the vibration spectrum, for example, by performing the fast Fourier transform for each of the normal vibration data and the vibration detection data.

The analysis unit 360 compares the normal vibration data and the vibration detection data with each other to determine whether or not machine part of the axle device 1A is abnormal (Step SB6).

As described with reference to FIG. 7, the analysis unit 360 determines whether or not the machine part is abnormal based on whether or not the difference ΔS between the peak value of the vibration spectrum, which is calculated based on the normal vibration data, and the peak value of the vibration spectrum, which is calculated based on the vibration detection data, is equal to or greater than the predetermined threshold value.

In Step SB6, when the difference ΔS is less than the threshold value and it is determined that machine part is not abnormal (Step SB6: No), the output unit 370 outputs an analysis result indicating that the machine part is not abnormal (Step SB8).

In Step SB6, when the difference ΔS is equal to or greater than the threshold value and it is determined that machine part is abnormal (Step SB6: No), the analysis unit 360 specifies such an abnormal machine part based on the correlation data stored in the correlation data storage unit 322 and the vibration detection data (Step SB7).

As described with reference to FIG. 8, the correlation data storage unit 322 stores the correlation data indicating the relationships between the rotational speed N of the drive shaft 3 and the vibration characteristics of the axle device 1A when the machine part is abnormal. When the rotational speed N of the drive shaft 3 is the rotational speed No and the frequency at which the difference ΔS as illustrated in FIG. 7 is equal to or greater than the threshold value is Ng1 for example, the analysis unit 360 can specify the first gear as abnormal (causing tooth lack).

The output unit 370 outputs the analysis result indicating that the machine part is abnormal and the analysis result indicating the machine part specified as abnormal (Step SB8).

As mentioned above, the output unit 370 outputs the analysis results to the control device 200. The input/output interface 230 of the control device 200 acquires the analysis results output from the vibration analysis device 300 (Step SA5).

[Effects]

As described above, according to the present embodiment, the state of the axle device 1A is analyzed based on the vibration detection data detected when the travel state of the dump truck 100 satisfies the prescribed conditions. As a result, the state of the axle device 1A can be analyzed under a condition where the travel state is fixed. Further, when the travel state satisfies the prescribed conditions, the vibration detection data detected by the vibration sensor 50 is suppressed from being affected by the disturbance. Hence, the state of the axle device 1A can be accurately recognized based on the analysis result of the vibration detection data, and the abnormality of the machine part can be detected at an early stage.

Other Embodiments

In the above-mentioned embodiment, the travel state is detected by the travel state detection device 400, and the state of the axle device 1A is analyzed based on the vibration detection data detected by the vibration sensor 50 when the travel state detected by the travel state detection device 400 satisfies the prescribed conditions. For example, when the position data indicating the position of the dump truck 100 when the travel state of the dump truck 100 satisfies the prescribed conditions is acquired by the position acquisition unit 250 and stored in the position data storage unit 222, the analysis unit 360 may analyze the state of the axle device 1A based on the vibration detection data acquired when the dump truck 100 travels at that position. The dump truck 100 often travels a determined route a plurality of times. It is highly possible that the travel state of the dump truck 100 is always constant at a certain position on the route. In such a case, even if the travel state detection device 400 does not always monitor the travel state of the dump truck 100, when the dump truck 100 travels at that position, the condition satisfaction determination unit 260 can determine that the travel state of the dump truck 100 satisfies the prescribed conditions. That is, when the dump truck 100 travels on the determined route a plurality of times, if the travel state detection device 400 detects the travel state only once or a plurality of times at the beginning, then the analysis unit 360 can thereafter analyze the state of the axle device 1A based on the vibration detection data acquired when the dump truck 100 travels at that position.

In the above-mentioned embodiment, at least a part of the functions of the control device 200 may be provided in the server 500, or at least a part of the functions of the vibration analysis device 300 may be provided in the server 500. Further, for example, the control device 200 may be mounted on the dump truck 100, and the vibration analysis device 300 may be disposed outside the dump truck 100.

The state detection system 1000 and the state detection method, which are described in the above-mentioned embodiment, can also be applied to the transmission device 1B.

In the above-described embodiment, the dump truck 100 may be an unmanned dump truck that travels by remote control or autonomously travels. Further, when the dump truck 100 is an unmanned dump truck, the throttle opening (accelerator opening) of the throttle valve of the power source 70 is adjusted based on a remote operation signal or a control signal.

In the above-mentioned embodiment, the dump truck 100 is defined to be a live-axle dump truck. The dump truck 100 may be an articulated dump truck having a front vehicle body frame, a rear vehicle body frame, and a joint mechanism that couples the front body frame and the rear body frame to each other.

In the above-mentioned embodiment, the work vehicle 100 is defined to be a dump truck. The work vehicle 100 just needs to be a wheel-driven work vehicle, and may be a wheel loader for example.

REFERENCE SIGNS LIST

1 ROTATING MACHINE
1A AXLE DEVICE (ROTATING MACHINE)
1B TRANSMISSION DEVICE (ROTATING MACHINE)
2 AXLE HOUSING
2A DIFFERENTIAL BODY
2B SIDE BODY
2H INTERNAL SPACE
3 DRIVE SHAFT
8 PINION CAGE
10 GEAR
20 BEARING
50 VIBRATION SENSOR
60 POSITION SENSOR
70 POWER SOURCE
73 ACCELERATOR PEDAL (ADJUSTMENT DEVICE)
80 NOTIFICATION DEVICE
100 DUMP TRUCK (WORK VEHICLE)
110 VEHICLE BODY FRAME
120 DUMP BODY
130 TRAVEL DEVICE
140 TIRE
150 WHEEL
150F FRONT WHEEL
150R REAR WHEEL
160 SUSPENSION DEVICE
170 STEERING DEVICE
180 COMMUNICATION DEVICE
190 COMMUNICATION DEVICE
200 CONTROL DEVICE
210 ARITHMETIC PROCESSING DEVICE
220 STORAGE DEVICE
221 PRESCRIBED CONDITION STORAGE UNIT
222 POSITION DATA STORAGE UNIT
223 DATA ACCUMULATION UNIT
230 INPUT/OUTPUT INTERFACE
240 TRAVEL STATE DATA ACQUISITION UNIT
241 ROTATIONAL SPEED ACQUISITION UNIT
242 PRESSURE ACQUISITION UNIT
243 ACCELERATOR OPENING ACQUISITION UNIT
244 STEERING ANGLE ACQUISITION UNIT
250 POSITION ACQUISITION UNIT
260 CONDITION SATISFACTION DETERMINATION UNIT
270 TRIGGER UNIT
300 VIBRATION ANALYSIS DEVICE
310 ARITHMETIC PROCESSING DEVICE
320 STORAGE DEVICE
321 NORMAL VIBRATION DATA STORAGE UNIT
322 CORRELATION DATA STORAGE UNIT
323 DATA ACCUMULATION UNIT
330 INPUT/OUTPUT INTERFACE
340 TRAVEL STATE DATA ACQUISITION UNIT
350 VIBRATION DETECTION DATA ACQUISITION UNIT
360 ANALYSIS UNIT
370 OUTPUT UNIT
400 TRAVEL STATE DETECTION DEVICE
410 ROTATIONAL SPEED SENSOR
420 PRESSURE SENSOR
430 ACCELERATOR OPENING SENSOR
440 STEERING ANGLE SENSOR
500 SERVER
510 ARITHMETIC PROCESSING DEVICE
520 STORAGE DEVICE
530 INPUT/OUTPUT INTERFACE
540 ABNORMALITY DETERMINATION UNIT
550 DATA ACCUMULATION UNIT
1000 STATE DETECTION SYSTEM
AX ROTATION AXIS
BX ROTATION AXIS

The invention claimed is:

1. A work vehicle state detection system comprising:
a travel state detection device that is provided in a work vehicle having a rotating machine which includes an axle device and detects a travel state of the work vehicle;
a vibration sensor provided in the rotating machine;
a travel state data acquisition unit that acquires travel state data indicating the travel state;
a condition satisfaction determination unit that determines whether or not the travel state satisfies a prescribed condition;
a prescribed condition storage unit that stores prescribed conditions regarding the travel state of the work vehicle;
a vibration detection data acquisition unit that acquires vibration detection data indicating a detection value of the vibration sensor when the travel state satisfies the prescribed condition;
a normal vibration data storage unit that stores normal vibration data indicating a detection value of the vibration sensor when the rotating machine is normal and the travel state satisfies the prescribed condition;
an analysis unit that, based on the vibration detection data and the normal vibration data, analyzes a state of the rotating machine when the vibration detection data is acquired, and
a trigger unit that outputs a trigger signal for starting a vibration analysis to the analysis unit when the state in which the travel state satisfies the prescribed conditions is maintained for a prescribed time,
whereby prescribed conditions define the travel state of the work vehicle in which a state of the axle device can be detected while a disturbance to the vibration sensor is suppressed when the vibration sensor detects a vibration of the axle device.

2. The work vehicle state detection system according to claim 1,
wherein the analysis of the state of the rotating machine includes a determination as to whether the rotating machine is abnormal.

3. The work vehicle state detection system according to claim 1, wherein the travel state includes a rotational speed of a drive shaft that applies a rotational force to the rotating machine, and wherein the prescribed condition includes one or both of that the rotational speed is equal to or greater than a prescribed rotational speed and that a fluctuation amount of the rotational speed per unit time remains within a first fluctuation range.

4. The work vehicle state detection system according to claim 1, wherein the travel state includes a pressure of a suspension cylinder of the work vehicle, and wherein the prescribed condition includes that a fluctuation amount of the pressure per unit time remains within a second fluctuation range.

5. The work vehicle state detection system according to claim 1, wherein the travel state includes an operation amount of an operating device that adjusts an output of a power source that drives the rotating machine, and wherein the prescribed condition includes that the operation amount is equal to or greater than a prescribed operation amount.

6. The work vehicle state detection system according to claim 1, wherein the travel state includes a steering angle of a steering device of the work vehicle, and wherein the prescribed condition includes that the steering angle remains within a prescribed steering angle.

7. The work vehicle state detection system according to claim 1, further comprising:

a position sensor that detects a position of the work vehicle; and a position data storage unit that stores position data indicating a position of the work vehicle when the travel state satisfies the prescribed condition, wherein the analysis unit analyzes the state of the rotating machine based on the vibration detection data acquired when the work vehicle travels at the position.

8. The work vehicle state detection system according to claim 1, wherein the rotating machine has a plurality of machine parts, wherein the work vehicle state detection system comprises a correlation data storage unit that stores correlation data indicating a relationship between the rotational speed of the drive shaft that applies the rotational force to the rotating machine and vibration characteristics of the rotating machine when the machine part is abnormal, and wherein the analysis unit specifies the abnormal machine part based on the correlation data and the vibration detection data.

9. The work vehicle state detection system according to claim 1, wherein the rotating machine has a housing that houses a plurality of machine parts, and wherein the vibration sensor is provided in the housing so as to detect a vertical vibration.

10. The work vehicle state detection system according to claim 1, wherein the analysis unit analyzes a state of the rotating machine based on the vibration detection data acquired during a period between a current point of time when the trigger signal is acquired and a preceding point of time preceding by the prescribed time from the current point of time.

11. The work vehicle state detection system according to claim 1, further comprising:

an output unit that outputs an analysis result of the analysis unit.

12. The work vehicle state detection system according to claim 11, wherein the output unit outputs the analysis result to a notification device mounted on the work vehicle.

13. The work vehicle state detection system according to claim 11, wherein the output unit outputs the analysis result to a server provided outside the work vehicle.

14. The work vehicle state detection system according to claim 1, further comprising:

a plurality vibration sensors provided in the rotating machine to detect vibration of the axle device in different directions; and a data accumulation unit that stores travel state data acquired by the travel state acquisition unit and that sequentially stores a plurality of vibration detection data in accordance with elapsed time.

15. The work vehicle state detection system according to claim 1, further comprising:

a correlation data storage unit that stores correlation data indicating a relationship between the rotational speed of the drive shaft that applies the rotational force to the rotating machine and vibration characteristics of the rotating machine when the machine part is abnormal, and an output unit that outputs an analysis result of the analysis unit to a notification device, wherein the analysis unit specifies the abnormal machine part based on the correlation data and the vibration detection data, wherein the notification device includes a display device, then the notification device displays display data indicating that the machine part is abnormal and when the notification device includes a sound output device, the notification device outputs a sound indicating that the machine part is abnormal, and the notification device may display data indicating that the machine part is normal, or may output a sound indicating that the machine part is normal.

16. A work vehicle comprising the work vehicle state detection system according to claim 1.

17. A work vehicle state detection method comprising:

causing a control device to acquire travel state data indicating a travel state of a work vehicle having a rotating machine which includes an axle device;

causing a vibration sensor to detect a vibration of the rotating machine;

causing the control device to determine whether or not the travel state satisfies a prescribed condition;

causing a prescribed condition storage unit to store prescribed conditions regarding the travel state of the work vehicle;

causing a normal vibration data storage unit to store normal vibration data;

causing an analysis processor unit, based on the vibration detection data and the normal vibration data, to analyze a state of the rotating machine when the vibration detection data is acquired, causing the control device to acquire an analysis result of the state of the rotating machine when vibration detection data is acquired, the vibration detection data indicating a detection value of a vibration of the rotating machine when the travel state satisfies the prescribed condition, based on the vibration detection data and normal vibration data indicating a detection value of a vibration of the rotating machine when the rotating machine is normal and the travel state satisfies the prescribed condition, and causing a trigger unit to output a trigger signal for starting a vibration analysis to the analysis processor unit when the state in which the travel state satisfies the prescribed conditions is maintained for a prescribed time, whereby prescribed conditions define the travel state of the work vehicle in which a state of the axle device can be detected while a disturbance to the vibration sensor is suppressed when the vibration sensor detects a vibration of the axle device.

18. A work vehicle state detection method comprising:

detecting a travel state of a work vehicle that has a rotating machine which includes an axle device;

detecting a vibration of the rotating machine;

determining whether or not the travel state satisfies a prescribed condition;

storing prescribed conditions regarding the travel state of the work vehicle;

determining a state of the rotating machine when vibration detection data is acquired, the vibration detection data being acquired when the travel state satisfies the prescribed condition, based on the vibration detection data and stored normal vibration data when the rotating machine is normal and the travel state satisfies the prescribed condition;

analyzing a state of the rotating machine, based on the vibration detection data and the normal vibration data, when the vibration detection data is acquired; and outputting a trigger signal for starting a vibration analysis when the state in which the travel state satisfies the prescribed conditions is maintained for a prescribed time, whereby prescribed conditions define the travel state of the work vehicle in which a state of the axle device can be detected while a disturbance to the vibration detecting is suppressed when the a vibration of the axle device is detected.

* * * * *